United States Patent [19]

Okey et al.

[11] Patent Number: 5,636,434

[45] Date of Patent: Jun. 10, 1997

[54] METHOD OF FABRICATING AN ELECTRICAL COIL HAVING AN INORGANIC INSULATION SYSTEM

[75] Inventors: Dave W. Okey, Rockford; Ted L. Jones, Cherry Valley, both of Ill.; Richard Rhodes, Alger; Glenn Hufstedler, Lima, both of Ohio

[73] Assignee: Sundstrand Corporation, Rockford, Ill.

[21] Appl. No.: 388,704

[22] Filed: Feb. 14, 1995

[51] Int. Cl.$^6$ ............... H01F 5/06; H01B 13/08; H01B 13/16; H01B 3/02
[52] U.S. Cl. ............... 29/605; 29/527.2; 29/620; 174/119 C; 174/122 C; 310/208; 310/45; 427/116
[58] Field of Search ............... 29/605, 620, 527.2, 29/469.5; 174/110 R, 119 C, 122 C; 310/45, 208; 336/205; 427/374.4, 374.7, 376.1; 428/383, 384

[56] References Cited

U.S. PATENT DOCUMENTS

| | | | |
|---|---|---|---|
| 2,848,794 | 8/1958 | Roth | 29/527.2 X |
| 3,018,321 | 1/1962 | Heckel et al. | 174/119 C X |
| 3,273,225 | 9/1966 | Saums et al. | 427/116 X |
| 3,352,009 | 11/1967 | Cohn et al. | 29/605 |
| 3,867,758 | 2/1975 | Johnson | 29/605 |
| 4,009,306 | 2/1977 | Yanashita et al. | 427/374.4 |
| 4,056,883 | 11/1977 | Danner | 29/605 X |
| 4,342,814 | 8/1982 | Usuki et al. | 428/383 |
| 4,429,007 | 1/1984 | Bich et al. | 427/374.7 |
| 4,534,997 | 8/1985 | Brotz | 427/116 X |
| 4,562,164 | 12/1985 | Miyazaki et al. | 174/110 R X |
| 4,652,218 | 3/1987 | Tsutsui et al. | 310/208 X |
| 5,083,366 | 1/1992 | Arakawa et al. | 29/605 |
| 5,140,292 | 8/1992 | Aronow | 29/605 X |
| 5,280,206 | 1/1994 | Ando et al. | 310/45 X |
| 5,350,638 | 9/1994 | Sawada et al. | 174/110 R X |

OTHER PUBLICATIONS

Karl–J. Best and Hans Hillmann. Magnet Construction by Wet Winding Technique with Ceramic Material. IEEE Transactions on Magnetics, vol. MAG–17, No. 5, Sep., 1981, pp.2312–2315.

*Primary Examiner*—Peter Vo
*Attorney, Agent, or Firm*—Lawrence E. Crowe

[57] ABSTRACT

A high temperature electrical insulation system is provided by forming a winding in an electrical device from a conductor that is pre-coated with a first layer of at least partially cured inorganic material. A second layer of inorganic material is applied, either during or just prior to forming the winding, over the first layer in order to seal any cracks in the first layer. The resultant electrical insulative coating is cured following the forming process, essentially at room temperature. The insulation system provided is thus totally inorganic, and its manufacture does not require the use of organics, or heating to high temperatures to cure the coating or to cause pyrolysis and/or volatilization of organic elements, as did prior electrical insulation systems. Furthermore, because no organics are utilized in either the manufacture or operation of the insulation system, there is no residual carbon in the resultant coating. The problem of reduced dielectric strength—caused by residual carbon—which plagued some prior attempts to develop polymer based high temperature insulation systems, is thus eliminated. By utilizing only inorganic materials, the insulation system provided is capable of operating satisfactorily for extended periods of time at temperatures in excess of 500° F.

6 Claims, 4 Drawing Sheets

METHOD OF FABRICATING AN ELECTRICAL COIL HAVING AN INORGANIC INSULATION SYSTEM

FIELD OF THE INVENTION

Our invention relates to devices having electrical windings, and, in particular, to devices having electrical windings that must withstand exposure to a wide range of temperatures, including temperatures higher than 500° F. Specifically, our invention is applicable to devices such as motors, generators, magnetic bearings, potentiometers, solenoids, transformers, electromagnetic or sensing coils, etc., and to apparatus incorporating such devices.

BACKGROUND

Many electrical devices include windings or coils, formed by one or more turns of an electrical conductor. For such windings to operate efficiently, adjacent turns of the windings must be electrically insulated from one another, and from any electrically conducted support structures or cores. Generally, they must also be insulated from the environment to prevent arcing or short circuits caused by environmental factors such as low ambient pressure, or the presence of foreign matter or moisture.

The requisite insulation is typically provided by forming the winding from a length of pre-insulated wire having an outer coating of electrically insulative material deposited upon an electrical conductor. The windings are generally formed by bending a length of wire into a predetermined shape about a mandrel. Alternatively, the winding may be formed by bending the wire directly about a support structure or a magnetic core that is part of the electrical device. Other non-electrically conducting materials in the form of separator sheets or potting compounds may also be utilized in conjunction with the insulated wire to complete the electrical insulation system by providing additional protection against electrical short circuits or environmental factors.

Desirable coating materials for such pre-insulated wire will typically have a high dielectric strength so that only a minimal thickness of insulation is required. A thin coating allows the physical size of the winding to be minimized. Alternatively, if the coating is very thin with respect to the size of the electrical conductor, a larger electrical conductor, or a greater number of turns may be accommodated in the area available for the winding. In general, the coating must not be more than a few thousandths of an inch thick to achieve a power density in the winding that is high enough for most practical electrical devices. The coating must be essentially impervious to the operational environment. The coating must also be flexible enough to allow the winding to be bent into the desired shape without cracking, and yet be tough enough to resist deformation or other damage during fabrication and operation of the winding.

For electrical devices which are not exposed to high temperatures, a variety of organic polymer compounds are suitable for use as electrically insulative coatings. Generally, organic polymer coated wire is formed by drawing the electrical conductor through a die, applying the polymeric coating, and drying or curing the coating to form the finished insulated wire. The resulting coating is adherent, tough, continuous, and can be readily bent without cracking.

Organic polymer coatings have not been suitable for use in electrical devices exposed to elevated temperatures in excess of about 350° F., however, because virtually all known polymers oxidize, degrade, and lose their dielectric properties when exposed to such temperatures. For elevated temperatures in excess of 350° F. other insulation systems must be employed. In the past, two basic approaches have been utilized for high temperature electrical insulation systems, but neither approach has been entirely satisfactory. In the first approach, the organic polymer coating on the pre-insulated wire is entirely replaced with an inorganic coating material, such as glass or a ceramic, that is capable of operating as a dielectric at very high temperatures. The second basic approach utilizes a combination of organic and inorganic materials to form the insulative coating.

The main problem encountered in prior attempts to completely replace the organic coating with an inorganic material has been that all known inorganic glass or ceramic materials are brittle and tend to crack when the wire is bent to form the windings. These cracks tend to significantly reduce the dielectric properties of the coating, and expose the electrical conductor to contamination by moisture or foreign matter in the operating environment. Such contamination increases the likelihood of short circuits or arcing from the winding. The arcing problem is particularly significant for electrical devices operating at high voltage and while exposed to rarified atmospheric environments such as those encountered by aircraft while operating at high altitudes. Electrical performance can thus be severely degraded by such cracking of the coating.

Since brittleness is an inherent characteristic of all inorganic dielectrics, the use of inorganic insulating materials as the sole insulation for electromagnetic windings has been essentially restricted to windings having very large bend radii in comparison to the diameter of the electrical conductor. For wires having diameters larger than about 0.080 in., cracking sometimes occurs even when the bend radii is more than ten times the diameter of the electrical conductor.

In an attempt to provide a wire with an inorganic coating which would withstand bending, some prior electrical insulation systems have utilized a flexible woven sleeve of glass or ceramic material, either directly over a bare electrical conductor or as a secondary insulative layer over a continuous primary insulative layer of either organic or inorganic material. This approach is not entirely satisfactory because the sleeving is bulky, and thus takes up an unacceptable percentage of the volume available for the electrical conductor in many electrical devices, thereby adversely affecting the power density which can be achieved. The sleeving also has a propensity, in some applications, to fray and create undesirable dust, and to act as a wick for moisture.

The second basic approach used in the past encompasses a number of schemes for utilizing combinations of organic and inorganic coatings or potting materials to provide an electrical insulation system. In some instances, an initial layer of an organic polymer is applied to the conductor, followed by a second layer of inorganic material. The polymer layer allows the insulated wire to be readily bent into the desired shape, with the inorganic layer being applied as a slurry either during or subsequent to forming the winding. The finished winding is then subjected to a high temperature in a controlled atmosphere to pyrolize the organic material and cure the inorganic material. In other instances a length of wire having either a woven or solid coating of cured inorganic material is bent to form the winding. A layer of organic material is then applied over the inorganic coating to fill any cracks in the inorganic coating. The organic layer is then often pyrolized, so that it does not further degrade or outgas when exposed to high temperature during operation of the winding.

There are two major problems with this second basic approach. First, the winding, and in some instances also the electrical device itself, must be heated to temperatures in the range of 700° to 2000° F. to cure the inorganic coating, and to pyrolize the organic coatings. Such heating can be detrimental to the electrical device, and adds additional fabrication time and expense. The second problem is that a carbon residue is left following pyrolysis. Carbon is electrically conductive. The residue thus degrades the dielectric strength of the insulation. To remove the carbon residue, some approaches heat the completed winding or electrical device in an oxidizing environment to temperatures in the range of 700° to 2000° F. in order to volatilize the carbon and remove it from the insulation in the form of CO or $CO_2$ gas. Although the volatilization process may remove much of the carbon, the cost and undesirable side effects incident with subjecting the winding or electrical device to high temperatures remain. In addition, some electrical devices include components made from materials which cannot withstand exposure to an oxidizing environment.

In one variant of the second basic approach, the electrical conductor is initially coated with a mixture of an inorganic material suspended in an organic binder. The mixture may also contain an organic solvent to facilitate application of the coating onto the conductor. The coated wire is then subjected to a heating cycle to partially cure the coating by driving off the solvent. The winding is then formed by bending the wire with the partially cured coating about a mandrel, or other form. The completed winding is then subjected to the pyrolizing and volatilizing steps previously described in order to remove the organic binder and produce an essentially inorganic coating on the electrical conductor. Although this approach would appear to alleviate some of the propensity of pure inorganic coatings to crack during bending and use, experience of the instant inventors has shown that cracking is not completely eliminated for small radius bends. The previously described problems of increased cost and risk of damage to the electrical device are also not alleviated with this approach.

In summary, the prior art does not teach a completely satisfactory high temperature electrical insulation system for use with windings in electrical devices. Existing systems are compromised by the potential for low dielectric characteristics due to the presence of cracking or carbon traces in the coating material. The need for exposure of the winding or the completed electrical device to temperatures as high as 2000° F. in order to pyrolize or volatilize the organics creates unwanted cycle time and cost, as well as undesirable risk of damage to the device.

Accordingly it is a primary object of our invention to provide an improved high temperature insulation system for a winding of an electrical device, and methods for fabricating such a system. Other objects include providing:

1. an insulation system which does not include organic components for operation or in its manufacture;
2. an insulation system which allows the use of commercially available pre-insulated inorganically coated wire;
3. an insulation system which does not require application of heat for curing any of the constituent coatings or other elements;
4. an insulation system that is applicable to a wide variety of electrical devices; and
5. an inexpensive arrangement for efficiently producing insulated electrical windings for use at elevated temperatures.

SUMMARY

Our invention provides an improved high temperature electrical insulation system which achieves the objects stated above by forming the winding from a conductor that is pre-coated with a first layer of at least partially cured inorganic material. A second layer of inorganic material is applied, either during or just prior to forming the winding, over the first layer in order to seal any cracks in the first layer. The resultant electrical insulative coating is cured following the forming process, essentially at room temperature.

The resulting structure is thus totally inorganic, and its manufacture does not require the use of organics, or heating to high temperatures to cure the coating or to cause pyrolysis and volatilization of organic elements, as did prior electrical insulation systems. Furthermore, because no organics are utilized in either the manufacture or operation of our insulation system, there is no residual carbon in the resultant coating. The problem of reduced dielectric strength—caused by residual carbon—which plagued some prior attempts to develop a high temperature insulation system, eliminated through can be the use of our system. Because we have utilized only inorganic materials, our insulation system is capable of operating satisfactorily for extended periods of time at temperatures in excess of 500° F.

Specifically, our invention comprises an apparatus including a length of insulated wire having a first layer of at least partially cured electrically insulative inorganic material applied to and surrounding an electrical conductor. The length of wire includes at least one bend produced by forming the wire subsequent to application of the first layer of electrically insulative inorganic material to the electrical conductor. A second layer of electrically insulative inorganic material is applied to the first layer of inorganic material subsequent to applying the first layer to the electrical conductor, in order to at least partially fill any cracks in the first layer caused by the forming of the bend.

According to a preferred embodiment of our invention, the second layer of inorganic material is applied in an uncured state over the first layer either during or just prior to the forming process, so that the second layer is still in the uncured or "wet" state when the winding is "wet-formed" by bending the coated conductor about a mandrel or other support structure. The second layer of inorganic material is then cured, essentially at room temperature.

In other embodiments of our invention, where a winding has multiple turns, a thin layer of fibrous material is included between adjacent turns of the winding to ensure that the second layer of inorganic material is not entirely squeezed out from between the turns as the winding is formed.

For yet other embodiments of our invention, a sealer coating of inorganic material is applied to the second layer of the inorganic coating, following any curing operations for the second layer. This sealer coating may have particular advantage in providing additional environmental sealing for windings which are exposed to a wide range of temperatures in an environment conducive to condensation of moisture.

We also wish to emphasize that because our insulation system can withstand exposure to very high temperatures, it may be used in conjunction with other coating or potting systems that rely on organic materials requiring high temperature curing, pyrolizing, or volatilizing operations during manufacture of the electrical device.

Other objects, advantages, and novel features of our invention will be readily apparent upon consideration of the following drawings and detailed description of preferred embodiments.

DETAILED DESCRIPTION OF PREFERRED EMBODIMENTS

Figure 1:
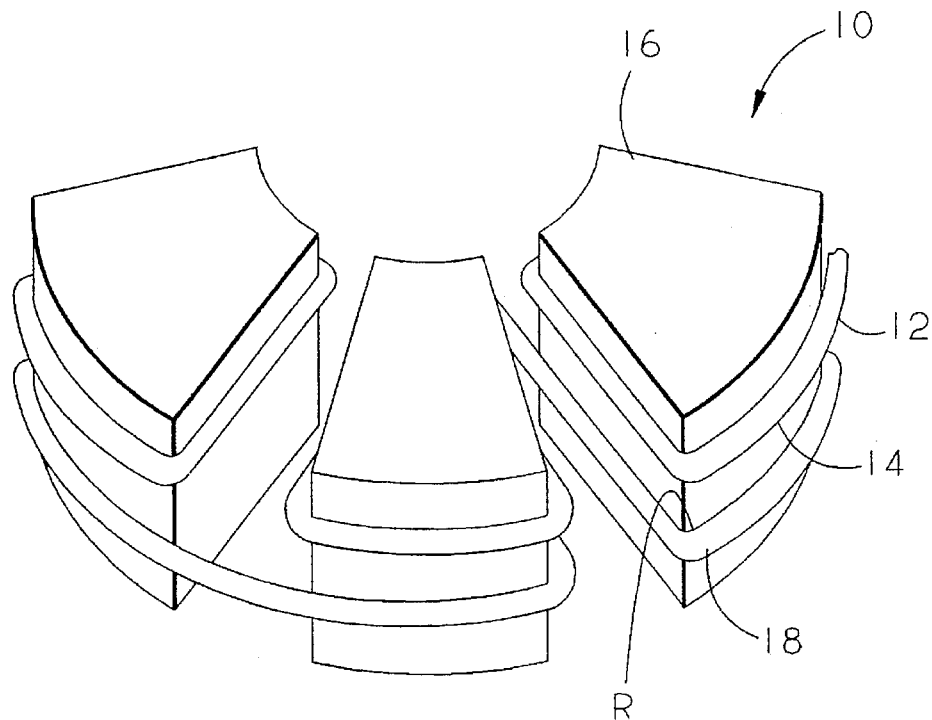
FIGS. 1–3 depict partial views of electrical devices including electrical windings insulated according to our invention.
Figure 2:
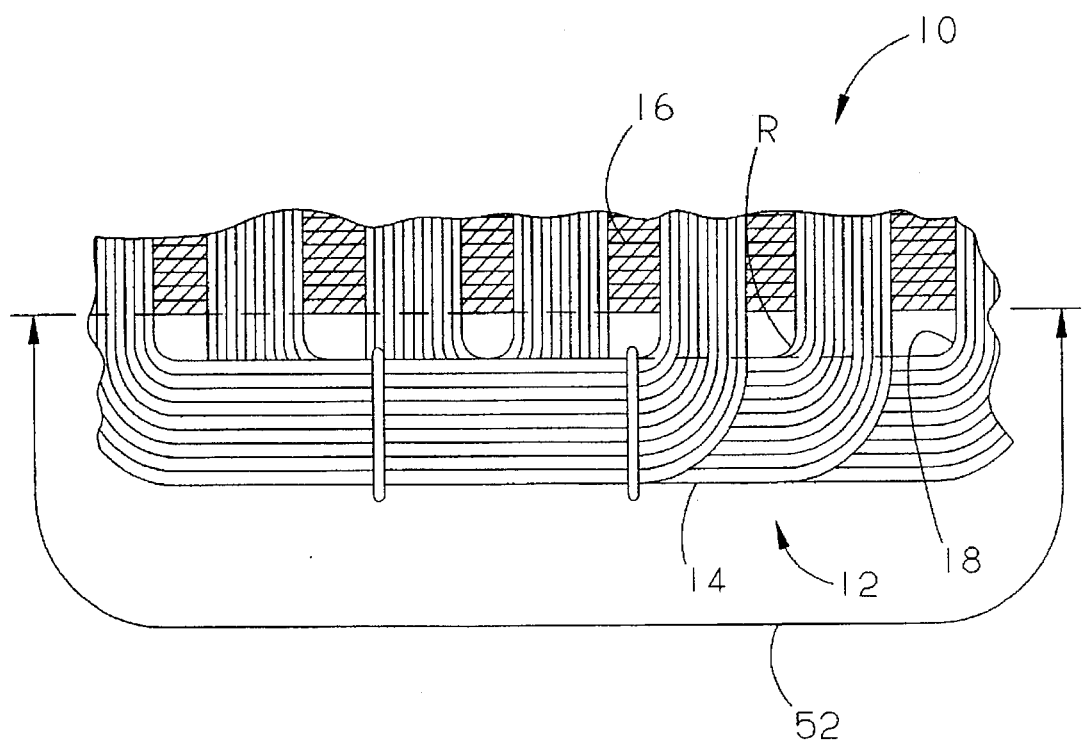
Figure 3:
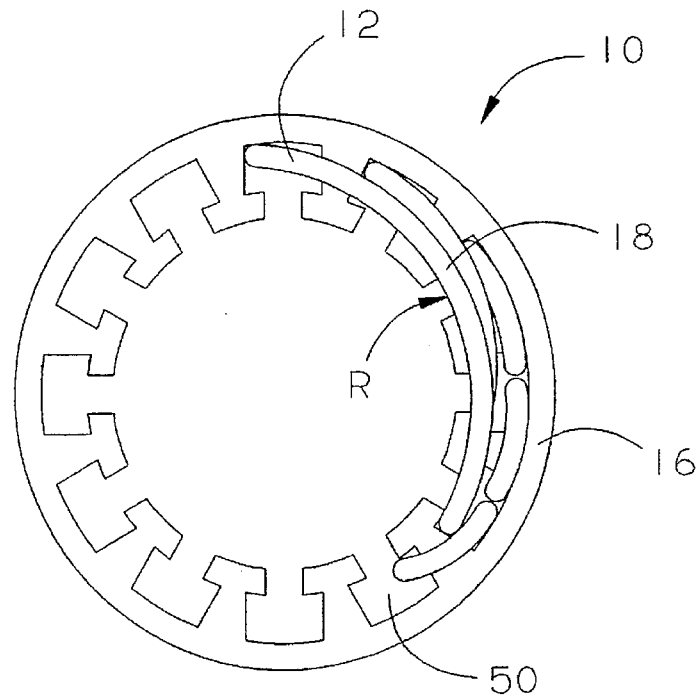

FIGS. 1-3 depict exemplary embodiments of electrical devices incorporating the electrical insulation system of our invention. We wish to emphasize, however, that the embodiments illustrated are merely exemplary of the virtually unlimited number of electrical devices that can benefit from the use of our insulation system. We specifically note, therefore, that the teachings of our invention are not limited to the specific embodiments depicted in the drawings accompanying this text.

Each of the exemplary embodiments depicted in FIGS. 1-3, wherein like reference numbers are used to indicate like parts, depicts a portion of an electrical device 10 having a winding 12 formed by bending a length of insulated wire 14 about a support structure in the form of an electrical core 16 which is part of the electrical device 10. Although the predetermined shapes of the windings 12 and the cores 16 vary significantly between the embodiments depicted in FIGS. 1-3, each of the windings 12 includes at least one bend or curvature 18 having a bend radius R.

Figure 4:
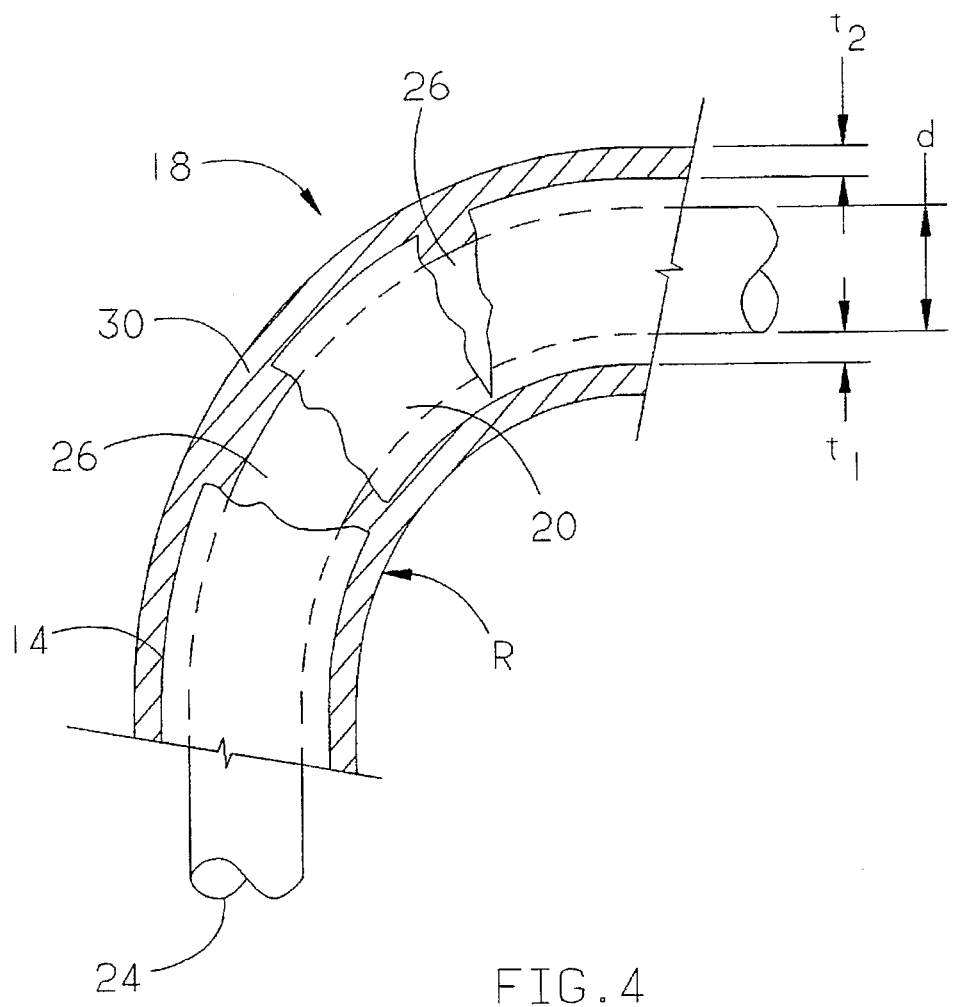

FIG. 4 is a generic depiction of one of these bends 18. As shown in FIG. 4, the insulated wire 14 used to form the winding 12 is pre-insulated with a first layer 20 of electrically insulative inorganic material, applied to and surrounding an electrical conductor 24 having a diameter d. As shown in FIG. 4, the first layer 20 of inorganic material may develop one or more cracks 26 as the bend 18 is formed. The pre-insulated wire 14 may also have developed cracks 26 or sustained other damage during fabrication of the wire 14, or as the result of being wound and unwound onto a reel or other device used to ship or store the wire 14. According to our invention, a second layer 30 of electrically insulative inorganic material is applied over the first layer 20 of inorganic material to at least partially fill and cover any cracks 26 or other damage to the first layer 20, as shown in FIG. 4. This second layer 30 of electrically insulative inorganic material is applied to the first layer 20 as the winding 12 is being formed by bending the wire 14 about the core 16. The resultant dual-layered coating is thus completely inorganic, and crack free.

Figure 5:
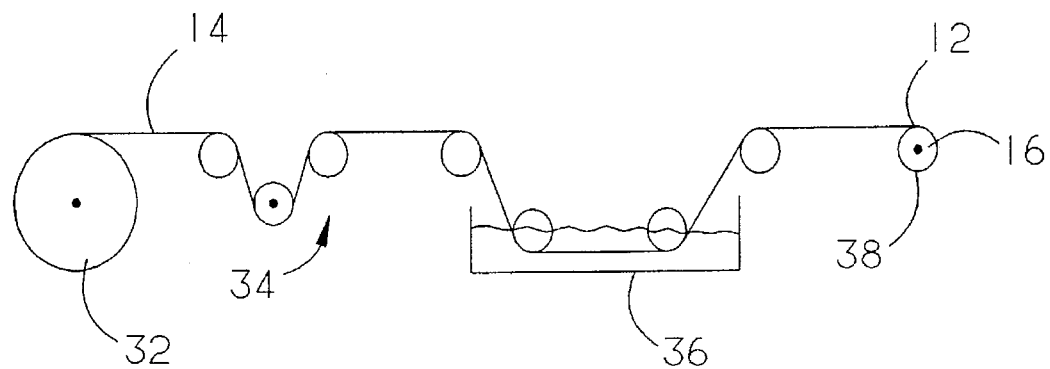
FIG. 5 is a schematic representation of an apparatus for automated fabrication of a winding utilizing the electrical insulation system of our invention.

A variety of methods may be utilized to apply the second layer 30 of the coating. Where the production rate of the electrical devices is low, or the desired quantity small, the cost of automated tooling may be avoided by brushing the second layer 30 onto the wire 14 as the winding 12 is being formed. In automated production, the second layer 30 may be applied by a variety of processes including, but not limited to, spraying, dipping, or passing the wire 14 through a fluidized bed of inorganic material. FIG. 5 illustrates one such automated process, in which the pre-insulated wire 14 passes sequentially from a spool 32, through tensioning means 34 and a bath 36 of the inorganic material, before being wound onto a mandrel 38 or support 16 to form the winding 12.

The second layer 30 of inorganic material is cured following forming of the winding 12 by methods suitable for the particular inorganic materials utilized in the first and second layers of the coating. Preferably this curing process is carried out essentially at room temperature, for example in the range of approximately 50° to 250° F.

Figure 6:
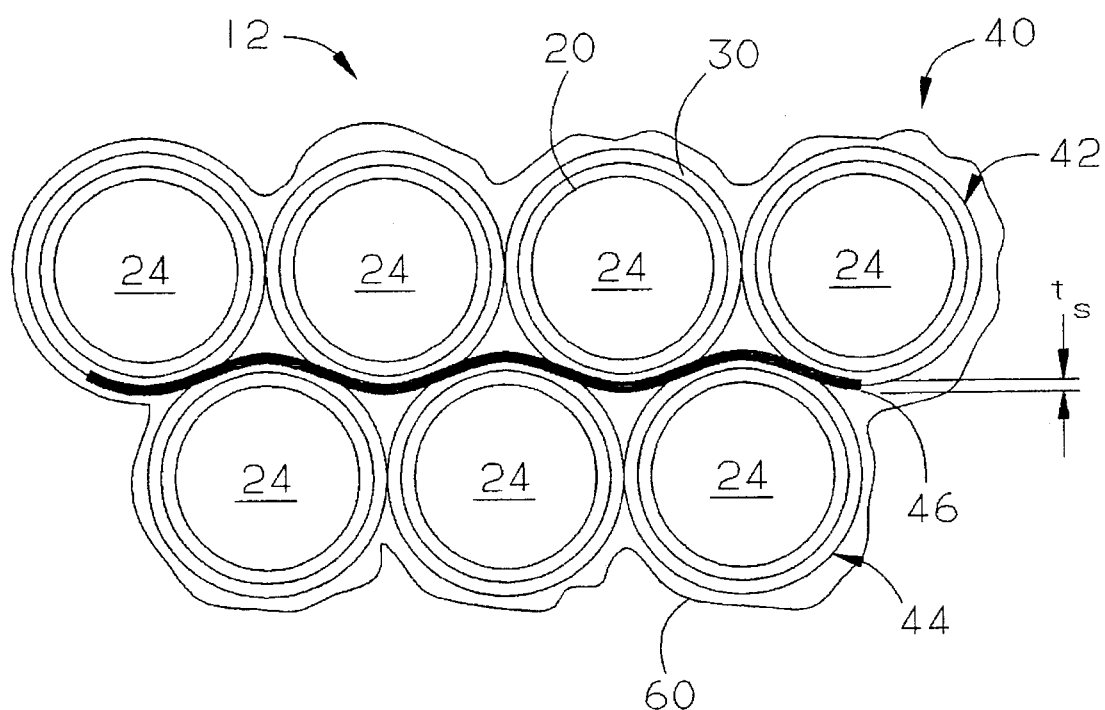

As shown in FIG. 6, for those windings 12 which form a coil 40 having first and second adjacent layers of turns 42, 44, we have found that in some embodiments of our invention it is advantageous to include a layer of fibrous separator 46 material between the adjacent layers of turns 42, 44. The fibrous separator 46 may be formed from any number of materials such as glass, ceramic, or aramid, in the form of matting or woven cloth. For high temperature operation, however, inorganic materials are generally preferred. The fibrous separator 46 functions to prevent the second layer 30 of inorganic material from being entirely squeezed out from between adjacent turns, or layers or turns 42, 44, as the winding 12 is formed by bending the wire 14 about the mandrel 38 or support 16. We have found that for most electrical devices a fibrous separator thickness $t_s$ of approximately 0.003 to 0.005 inches provides adequate separation, but separators 46 having significantly greater thicknesses can also be utilized. For electrical devices 10 such as those depicted in FIGS. 3 and 7 wherein a portion of the winding 12 passes through a channel or slot 50 of limited cross-sectional area, and the bends 18 are largely confined to an end turn area as indicated at 52 of FIGS. 2 or 3, it may be desirable to insert the fibrous separator 46 only in the end turn area 52. By limiting the fibrous separator 46 only to the vicinity of the bends 18, where cracking is most likely to occur, the cross-sectional area of the slots 50 available for the passage of the windings 12 is maximized.

Figure 7:
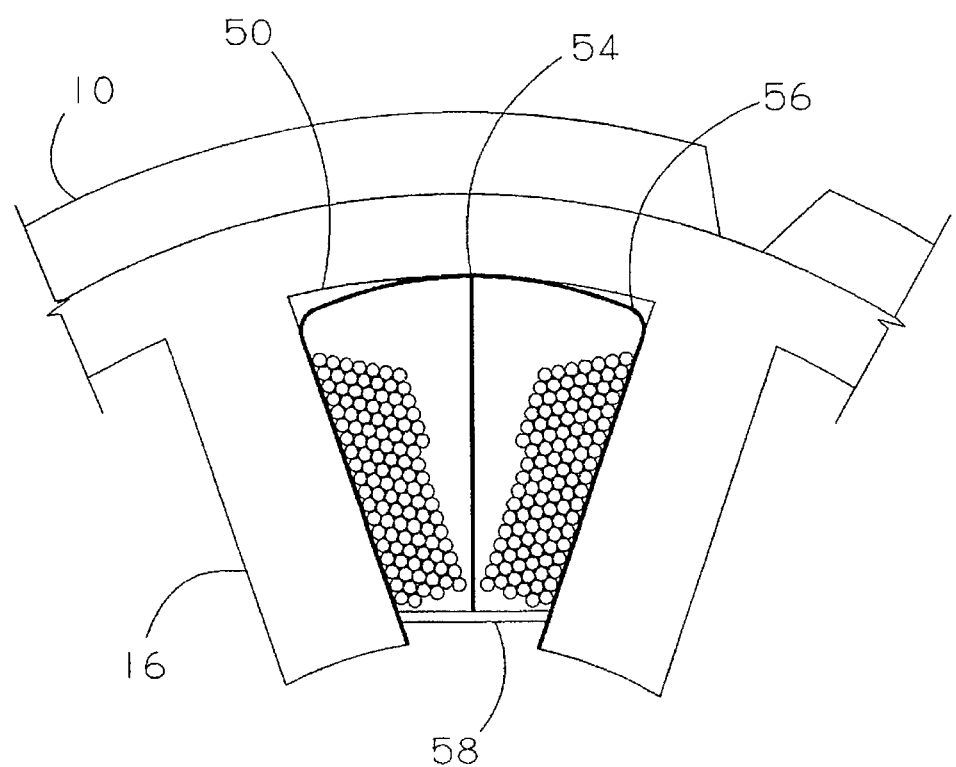
FIGS. 4, 6 and 7 illustrate details of the electrical insulation system of our invention.

As shown in FIG. 7, some embodiments of our insulation system also include other insulating devices such as phase separators 54, slot insulators 56, or mechanical constraint means such as the slot wedge 58. For high temperature use, it is advantageous to fabricate these other insulating devices from inorganic or metallic materials capable of high temperature service.

For those electrical devices which must operate over a wide range of temperatures, and particularly under conditions conducive to the formation of moisture, our insulation system also includes a sealer coating 60, as illustrated in FIG. 6, applied to the completed winding 12 after curing of the second layer 30. This sealer coating is not required for high temperature operation, but may be advantageous if the electrical device 10 must operate at low temperatures which might cause moisture or condensation to adsorb onto the windings 12. Many types of sealers including silicone and ceramic materials are suitable for use as the sealer coating 60 in our insulation system.

The following examples are given for the purpose of illustrating our invention. It will be understood that our invention is not limited to the embodiments described in these examples. Reference numbers used in the examples coordinate generally with the exemplary embodiments of FIGS. 1-7, and particularly with FIG. 4.

First Example

A stator for an electric motor was fabricated using a length of pre-insulated wire having a fully cured 0.0003 to 0.0005 inches thick $t_1$ layer 20 of ceramic insulation surrounding a 23 Gage (0.022 nominal) diameter d electrical conductor 24. The particular wire used was purchased from Ceramawire Corporation, of Elizabeth City, N.C. as their part number Kulgrid 23 gauge, and was coated with their proprietary ceramic coating. The pre-insulated wire was wound around a laminated electrical core of Hiperco 50 material to form a winding having several bends 18 with a bend radius R of approximately 0.125 inches, thus giving a ratio of bend radius R to wire diameter d of less than 6:1. As the winding was formed, a slurry of an inorganic ceramic coating 30 was brushed onto the pre-insulated wire, so that the winding was wet-formed about the core. The inorganic material 30 brushed on was a ceramic known as Sauereisn DW-30, sold by the Sauereisn Company of Pittsburgh, Pa.

This particular ceramic coating was selected after testing to determine that it exhibited a coefficient of thermal expansion similar to the Ceramawire pre-insulated wire. The coating selected also possessed superior structural properties, as well as having suitable viscosity and a pot-life sufficiently long to allow for wet forming of the winding. The DW-30 coating also does not require a high temperature cure. It can be cured in 24 hours at room temperature, or one hour at 180° F.

A layer of woven glass fabric 46 having a thickness $t_s$ of 0.003 to 0.005 inches was inserted between adjacent layers 42, 44 of end turns 52 of the winding, as the winding was being wet formed. Phase separators, and slot liners of MICA material were installed as the winding was formed. Slot wedges were installed, and the entire stator assembly was cured for one hour at 180° F.

A sealer coating 60 was then applied to the cured winding. A combination silicone-glass material, sold under the trade name Cotronics 1529UHT by Cotronics Corporation of Brooklyn, N.Y., was utilized as the sealer coating. The coating was diluted with a mixture of toluene/xylene, daubed on to the stator windings and allowed to dry at room temperature. The stator was then dried for 2 hours at 200° F., and an additional 2 hours at 250° F. The sealer coating was then glazed by holding the stator at 900° F. for 2 hours.

It will be understood that the sealer coating 60 was utilized for this particular stator because it was subject to low temperatures and exposure to condensation. It bears repeating that the sealer and the process steps associated with the sealer are not required by other embodiments of our invention intended to operate at high temperatures only, or in environments where moisture is not a problem.

The resultant second layer 30 of inorganic material had a nominal thickness $t_2$ of about 0.0005 to 0.003 in. The sealer coating 60 had a nominal thickness of about 0.0002 to 0.001.

Second Example

The second example is also stator for an electric motor. The construction was essentially identical to the first example, except that a 19 Gage (0.033" nominal) diameter wire was utilized for the electrical conductor of the pre-insulated wire. The ratio of the bend radius R to wire diameter d was thus less than 4:1 for the second example.

In both of the examples given above, some cracking 26 occurred in the bends of the stator windings. The second layer 30 of inorganic material filled these cracks 26, however, and the completed stator was successfully hi-potted and operated at 500° F. An alternative inorganic coating suitable for use in forming the second layer 30 of our invention is sold under the tradename Aremco Ceramabond #571, by Aremco Products Inc. of Ossining, N.Y.

From the foregoing description, those skilled in the art will readily recognize that the high temperature electrical insulation system of our invention overcomes problems encountered in prior attempts to provide a practical electrical insulation system for use at elevated temperatures, in excess of 500° F. Specifically, our system provides an entirely inorganic insulation system. The problem encountered in prior insulation systems of reduced dielectric strength due to the presence of residual carbon is thus eliminated by our insulation system. The need for exposure of the electrical device to high temperatures in order to pyrolize, volitalize, or otherwise treat an organic constituent to remove residual carbon, as was required in prior systems using polymer based coatings, is also eliminated, thereby reducing cost, cycle time, and risk of damaging the electrical device. In those instances where it is desirable to heat the electrical device to high temperatures, such as where a glazed sealcoat is required for environmental protection, our insulation system provides advantages over prior systems which were not capable of withstanding exposure to temperatures in excess of 350° F.

Those skilled in the art will further recognize that, although we have described our invention herein with respect to several specific embodiments thereof, many other embodiments and applications of our invention are possible within the scope of our invention as described in the appended claims. For example, the insulated wire 14 can be wound in a partially cured rather than a fully cured state, and fully cured at the same time as the second layer 30 of insulation. Even in electrical devices not exposed to high temperature, our insulation system may provide superior manufacturability, or environmental exposure capabilities beyond those achievable using more conventional insulation techniques. It is understood, therefore, that the spirit and scope of the appended claims should not be limited to the specific embodiments described and depicted herein.

We claim:

1. A method of fabricating an electrical coil comprising the steps of:

a) winding a length of insulated wire having a first layer of at least partially cured electrically insulated inorganic material applied to and surrounding an electrical conductor into one or more turns to form said coil, said insulated wire having no organic material therein; and b) while winding said length of wire, applying a second layer of electrically insulated inorganic material to said first layer of electrically insulated inorganic material to at least partially fill any cracks in said first layer caused by winding said one or more turns.

2. The method of claim 1 wherein said second layer of electrically insulative inorganic material is applied in an uncured state, and wherein said method further includes a step c) following step b) of curing said second layer subsequent to winding said coil.

3. The method of claim 2 wherein said curing is accomplished by holding said coil at room temperature for a length of time sufficient to allow said second layer to cure.

4. The method of claim 2 wherein said curing is accomplished by holding said coil at an elevated temperature for a length of time sufficient to allow said second layer to cure.

5. The method of claim 1 wherein said coil is wound in such a manner as to provide adjacent turns of said insulated wire, and including a further step d) of inserting a layer of fibrous material between said adjacent turns while winding said length of insulated wire to form said coil.

6. The method of claim 1 including the further step e) of applying a sealer to said coil following said winding of said length of said insulated wire to form said coil.

* * * * *